US010852732B2

(12) United States Patent
Lim et al.

(10) Patent No.: US 10,852,732 B2
(45) Date of Patent: Dec. 1, 2020

(54) DEEP LEARNING BASED SELF-DRIVING CAR, DEEP LEARNING BASED SELF-DRIVING CONTROL DEVICE, AND DEEP LEARNING BASED SELF-DRIVING CONTROL METHOD

(71) Applicant: MANDO CORPORATION, Pyeongtaek-si (KR)

(72) Inventors: Hae Sueng Lim, Yongin-si (KR); Seong Hee Jeong, Yongin-si (KR); Jae Eun Lee, Seoul (KR)

(73) Assignee: MANDO CORPORATION, Pyeongtaek-si (KR)

(*) Notice: Subject to any disclaimer, the term of this patent is extended or adjusted under 35 U.S.C. 154(b) by 24 days.

(21) Appl. No.: 16/058,328

(22) Filed: Aug. 8, 2018

(65) Prior Publication Data
US 2019/0049967 A1    Feb. 14, 2019

(30) Foreign Application Priority Data
Aug. 8, 2017    (KR) .................. 10-2017-0100429

(51) Int. Cl.
*G05D 1/00*      (2006.01)
*G05D 1/02*      (2020.01)

(52) U.S. Cl.
CPC .......... *G05D 1/0088* (2013.01); *G05D 1/0221* (2013.01); *G05D 2201/0213* (2013.01)

(58) Field of Classification Search
CPC .............................. G05D 1/0088; G05D 1/0221
See application file for complete search history.

(56) References Cited

U.S. PATENT DOCUMENTS

| 2018/0032082 A1* | 2/2018 | Shalev-Shwartz ................ G05D 1/0088 |
| 2018/0275657 A1* | 9/2018 | You ................... G05B 23/0229 |
| 2019/0009794 A1* | 1/2019 | Toyoda ............... B60W 30/182 |

FOREIGN PATENT DOCUMENTS

CN      107200017 A   *   9/2017

OTHER PUBLICATIONS

Engllish translation for CN107200017A. (Year: 2017).*
English machine translation (CN107200017-A). (Year: 2017).*

* cited by examiner

*Primary Examiner* — Geepy Pe
*Assistant Examiner* — Bakari Underwood
(74) *Attorney, Agent, or Firm* — Morgan, Lewis & Bockius LLP (57) ABSTRACT

The present embodiments relate to a deep learning-based self-driving vehicle, a deep learning-based self-driving control device, and a deep learning-based self-driving control method, and more particularly, to a deep learning-based self-driving vehicle, a deep learning-based self-driving control device, and a deep learning-based self-driving control method which are capable of reliably performing self-driving control to a necessary degree in a necessary situation by accurately distinguishing between and recognizing a control target object referenced while the self-driving vehicle is traveling and a structure not referenced.

14 Claims, 8 Drawing Sheets

DEEP LEARNING BASED SELF-DRIVING CAR, DEEP LEARNING BASED SELF-DRIVING CONTROL DEVICE, AND DEEP LEARNING BASED SELF-DRIVING CONTROL METHOD

CROSS REFERENCE TO RELATED APPLICATION

This application claims priority from Korean Patent Application No. 10-2017-0100429, filed on Aug. 8, 2017, which is hereby incorporated by reference for all purposes as if fully set forth herein.

BACKGROUND OF THE INVENTION

1. Field of the Invention

The present disclosure relates to self-driving control technology.

2. Description of the Prior Art

Recently, with the development of vehicle control technology, self-driving control technology, in which a vehicle is self-driving without a driver's operation, has been developed.

The self-driving control technology detects objects near a corresponding vehicle and controls a driving status and the like of the corresponding vehicle according to behaviors of the detected objects using the detection result.

The current self-driving control technology cannot accurately classify the types of objects through analysis of signals detected from objects ahead, and thus self-driving control is allowed only under specific conditions or is difficult to implement. Although a reliable autonomous control target (i.e., an object such as a vehicle or the like considered when a corresponding vehicle is self-driving) is detected, the reliability of the detection is not satisfactory.

SUMMARY OF THE INVENTION

In the foregoing background, embodiments of the present disclosure are to provide a deep learning-based self-driving vehicle, a deep learning-based self-driving control device, and a deep learning-based self-driving control method which are capable of performing self-driving control to a necessary degree in a necessary situation by accurately distinguishing between and recognizing a control target object (e.g., a vehicle ahead, a pedestrian, etc.) referenced while a self-driving vehicle is traveling and structures (e.g., an overpass, a deck plate, etc.) not referenced.

Embodiments of the present disclosure are also to provide a deep learning-based self-driving vehicle, a deep learning-based self-driving control device, and a deep learning-based self-driving control method which are capable of improving object distinction performance using a sensor signal of a radar sensor or the like and enabling self-driving with high reliability.

Embodiments of the present disclosure are also to provide a deep learning-based self-driving vehicle, a deep learning-based self-driving control device, and a deep learning-based self-driving control method which are capable of enabling self-driving control that even considers a driver's driving habits.

Embodiments of the present disclosure are also to provide a deep learning-based self-driving vehicle, a deep learning-based self-driving control device, and a deep learning-based self-driving control method which are capable of enabling recognition and distinction of a control target object with lower processing burden, faster processing speed, and more accurate recognition performance.

According to an aspect, the present embodiments may provide a deep learning-based self-driving control device including a deep learning algorithm execution unit configured to output a result of executing a deep learning algorithm on a monitoring signal obtained by monitoring a periphery of a vehicle; a self-driving control unit configured to, when the vehicle is self-driving, control the self-driving of the vehicle on the basis of the result of executing the deep learning algorithm; and a deep learning processing unit configured to change the deep learning algorithm with reference to driver driving information.

According to another aspect, the present embodiments may provide a deep learning-based self-driving vehicle including a sensor configured to monitor a periphery of the vehicle and output a monitoring signal; a deep learning-based self-driving control device configured to perform a deep learning algorithm on the monitoring signal and, when the vehicle is self-driving, output a control signal for controlling the self-driving of the vehicle on the basis of a result of executing the deep learning algorithm and change the deep learning algorithm with reference to driver driving information; and a driving device configured to drive the vehicle according to the control signal.

According to still another aspect, the present embodiments may provide a deep learning-based self-driving control method including: outputting a result of executing a deep learning algorithm on a monitoring signal obtained by monitoring a periphery of a vehicle; when the vehicle is self-driving, controlling the self-driving of the vehicle according to the result of executing the deep learning algorithm; and changing the deep learning algorithm with reference to driver driving information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each figure, it should be noted that the same elements will be designated by the same reference numerals, if possible, although they are shown in different drawings. Further, in the following description of the present disclosure, a detailed description of known functions and configurations incorporated herein will be omitted when it is determined that the description may make the subject matter of the present invention rather unclear.

In addition, terms such as first, second, A, B, (a), (b) or the like may be used herein when describing components of the present disclosure. Each of these terminologies is not used to define an essence, order, sequence, or number of a corresponding component but used merely to distinguish the corresponding component from other component(s). It should be noted that if it is described in the specification that one component is "connected," "coupled" or "joined" to another component, the former may be directly "connected," "coupled" or "joined" to the latter or "connected," "coupled" or "joined" to the latter via another component.

Figure 1:
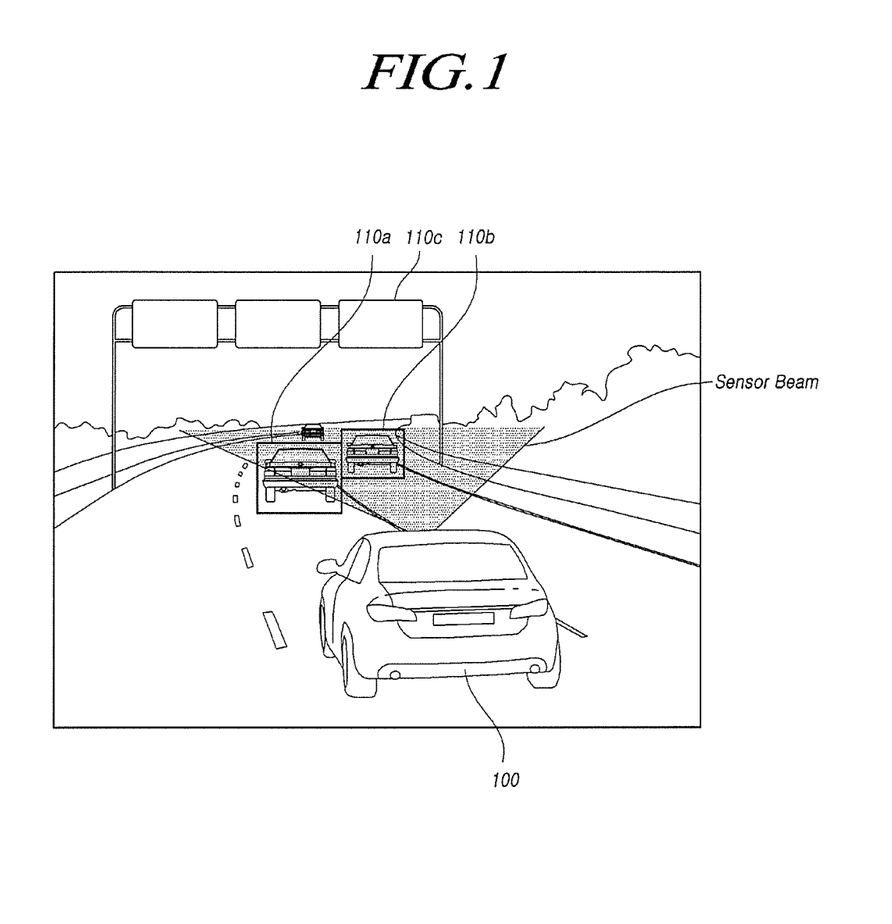
FIGS. 1 and 2 are views showing a deep learning-based self-driving vehicle according to the present embodiments.
Figure 2:
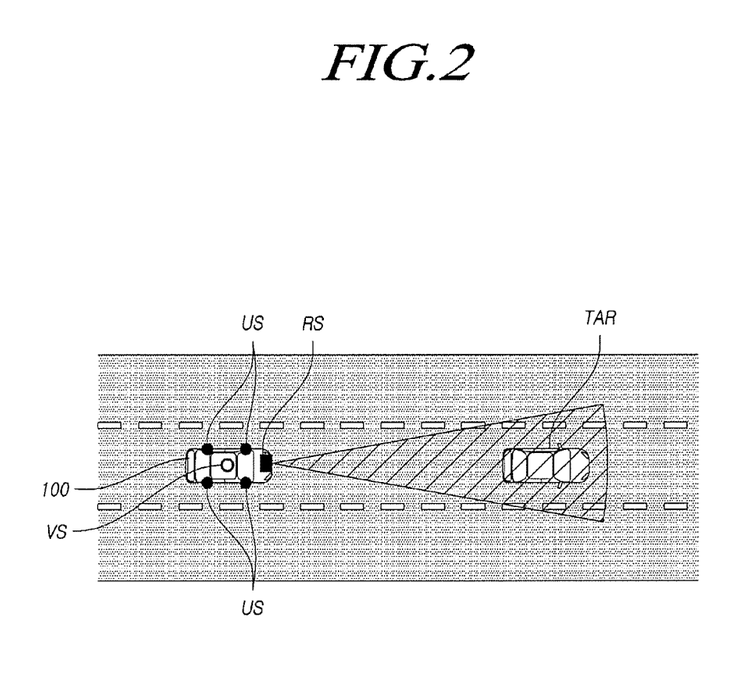

FIGS. 1 and 2 are views showing a deep learning-based self-driving vehicle 100 according to the present embodiments.

Referring to FIGS. 1 and 2, the self-driving vehicle 100 according to the present embodiments, which is a vehicle that is self-driving without a driver's operation, may automatically run by checking road conditions even though a driver does not control a brake, a steering wheel, an accelerator pedal, etc.

The self-driving vehicle 100 according to the present embodiments may include a driverless car.

The self-driving vehicle 100 according to the present embodiments may be self-driving by using various application control technologies applied to implement a smart car.

For example, a technology for automatically maintaining a distance between vehicles, Blind Spot Detection System, Autonomous Emergency Braking System, Lane Departure Warning System, Lane Keeping Assist System, Advanced Smart Cruise Control (ASCC) (a technology allowing a vehicle to travel at a set speed while maintaining a distance from vehicles ahead), Traffic Jam Assist, and the like may be applied to the self-driving vehicle 100.

In this specification, the self-driving vehicle 100 refers to a vehicle to which at least one of the above-described functions is applied to autonomously determine speed or steering without driver intervention. That is, the self-driving vehicle 100 according to the present disclosure includes a vehicle capable of autonomously controlling some functions (e.g., acceleration or deceleration) as well as a vehicle capable of autonomously controlling all behaviors. That is, the present disclosure may also be applied to a vehicle that performs cruise control. In this specification, such vehicles are collectively referred to as a self-driving vehicle.

Such various application control technologies require technologies for accurately detecting objects near the self-driving vehicle 100.

The objects (i.e., detected objects) near the self-driving vehicle 100 according to the present embodiments may include other vehicles 110a and 110b ahead, a structure 110c near a road, a pedestrian, etc.

The self-driving vehicle 100 according to the present embodiments performs self-driving control, that is, transmits sensor beams, detects nearby objects on the basis of received signals using sensors, and controls its own driving status according to behaviors of the detected objects.

The sensors installed in the self-driving vehicle 100 according to the present embodiments may include one or more of a radar sensor (RS), an ultrasonic sensor (US), a vision sensor (VS), a laser sensor, and a Lidar sensor.

Various types and numbers of sensors may be installed at various positions of the self-driving vehicle 100.

As an example of the self-driving control using object detection, when a vehicle 110a traveling ahead in a lane in which the self-driving vehicle 100 according to the present embodiments is traveling is detected, the self-driving vehicle 100 according to the present embodiments should regard the detected vehicle 110a as a control target object and control the speed, steering, and the like of the self-driving vehicle 100 according to the speed of the control target object.

As another example, when a simple road structure 110c such as an overpass, a deck plate, and a road sign is detected ahead on a road where the self-driving vehicle 100 according to the present embodiments is traveling, the self-driving vehicle 100 according to the present embodiments excludes the detected road structure 110c from the control target object and does not slow nor brake in consideration of the road structure 110c.

As still another example, when a road structure 110c such as a speed enforcement sensor is detected ahead on a road where the self-driving vehicle 100 according to the present embodiments is traveling, the self-driving vehicle 100 according to the present embodiments may control speed in consideration of the location of, and the distance from, the detected speed enforcement sensor.

As still another example, when a pedestrian is detected near a road where the self-driving vehicle 100 according to the present embodiments is traveling, the self-driving vehicle 100 according to the present embodiments may control speed, steering, and the like in consideration of the location of, and the distance from, the detected pedestrian.

As described above, in order to perform accurate self-driving control, there is a need for the self-driving vehicle 100 according to the present embodiments to accurately classify and detect the types of objects, as well as accurately detecting nearby objects, to accurately perform various vehicle behavior control operations (e.g., speed control such as acceleration and deceleration, braking control, steering control, and the like) only when absolutely necessary.

However, a conventional sensor technology can detect the presence of, distances from, and locations of nearby objects, but cannot accurately classify is and detect the types of objects and also cannot apply the detection result to the vehicle behavior control.

Thus, the self-driving vehicle 100 according to the present embodiments may accurately classify the types of the nearby objects on the basis of deep learning, select a target object TAR which affects the self-driving control on the basis of the classification, and perform the self-driving control in an accurate condition by an accurate amount of control.

In detail, the self-driving vehicle 100 according to the present embodiments executes a deep learning algorithm using a deep neural network and then performs self-driving control on the basis of the execution result.

In order to enhance accuracy of the result of executing the deep learning algorithm using the deep neural network, the deep learning algorithm needs to be trained.

The deep learning-based self-driving vehicle 100 according to the present embodiments may train the deep learning algorithm using driver driving information, which is collected during on-road driving, without needing to collect or process separate training data.

Accordingly, the deep learning-based self-driving vehicle 100 according to the present embodiments may easily improve the accuracy of the result of executing the deep learning algorithm by increasing the amount of training of the deep learning algorithm through the continuous on-road driving of the driver.

Since the deep learning-based self-driving vehicle 100 according to the present embodiments trains the deep learning algorithm using the driver driving information, it is possible to perform self-driving control that even considers a driver's driving habits.

Figure 3:
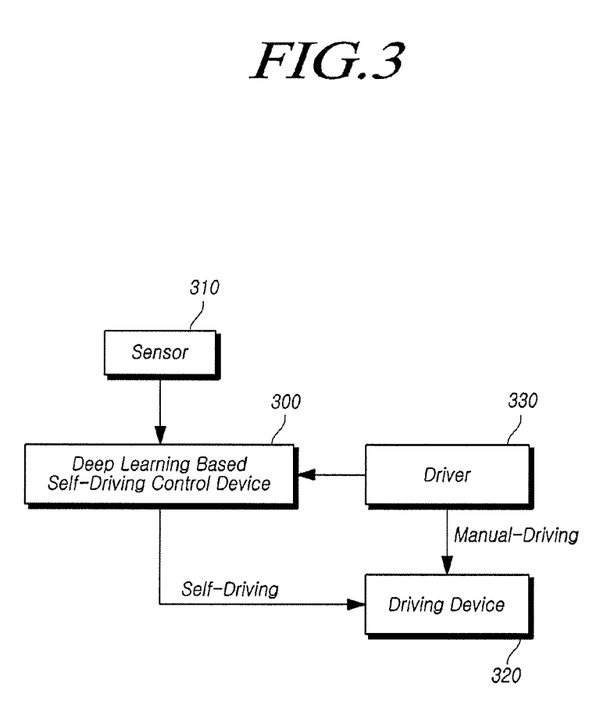
FIG. 3 is a block diagram of a deep learning-based self-driving vehicle according to the present embodiments.

FIG. 3 is a block diagram of the deep learning-based self-driving vehicle according to the present embodiments.

Referring to FIG. 3, the deep learning-based self-driving vehicle 100 according to the present embodiments may include a sensor 310 configured to monitor a periphery of the vehicle 100 and output a monitoring signal, a deep learning-based self-driving control device 320 configured to execute a deep learning algorithm on the monitoring signal, output a control signal for controlling self-driving of the vehicle 100 on the basis of a result of executing the deep learning algorithm when self-driving is performed, and change the deep learning algorithm with reference to driver driving information of a driver 330 when self-driving is not performed, a driving device 320 configured to perform vehicular driving according to the control signal, and the like.

Here, the driving device 320 may include one or more of a speed adjustment device, a steering device, a braking device, and the like.

Through the execution of the deep learning algorithm on the monitoring signal, the deep learning-based self-driving control device 320 may determine whether an object in front of the vehicle is a control target object TAR for self-driving control on the basis of the monitoring signal and may acquire a deep learning algorithm execution result including one or more of the presence or absence of control, the amount of calculation control (e.g., the amount of acceleration/deceleration control corresponding to vehicle speed control information), a control target object recognition result, and the like.

The deep learning-based self-driving control device 320 may perform a deep learning training process when self-driving is not performed.

To this end, the deep learning-based self-driving control device 320 may perform the deep learning training process including comparing the amount of calculation control included in the result of executing the deep learning algorithm to the amount of driver input control included in the driver driving information of the driver 330, calculating an error value (a difference between the amount of calculation control and the amount of driver input control) according to a result of the comparison, and adjusting weights in a deep neural network associated with the execution of the deep learning algorithm on the basis of the error value.

The sensor 310 may include one or more of, for example, a radar sensor, an ultrasonic sensor, a laser sensor, a lidar sensor, and a vision sensor.

Figure 4:
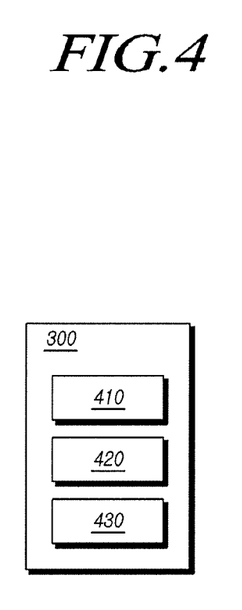
FIG. 4 is a block diagram of a deep learning-based self-driving control device according to the present embodiments.
Figure 5:
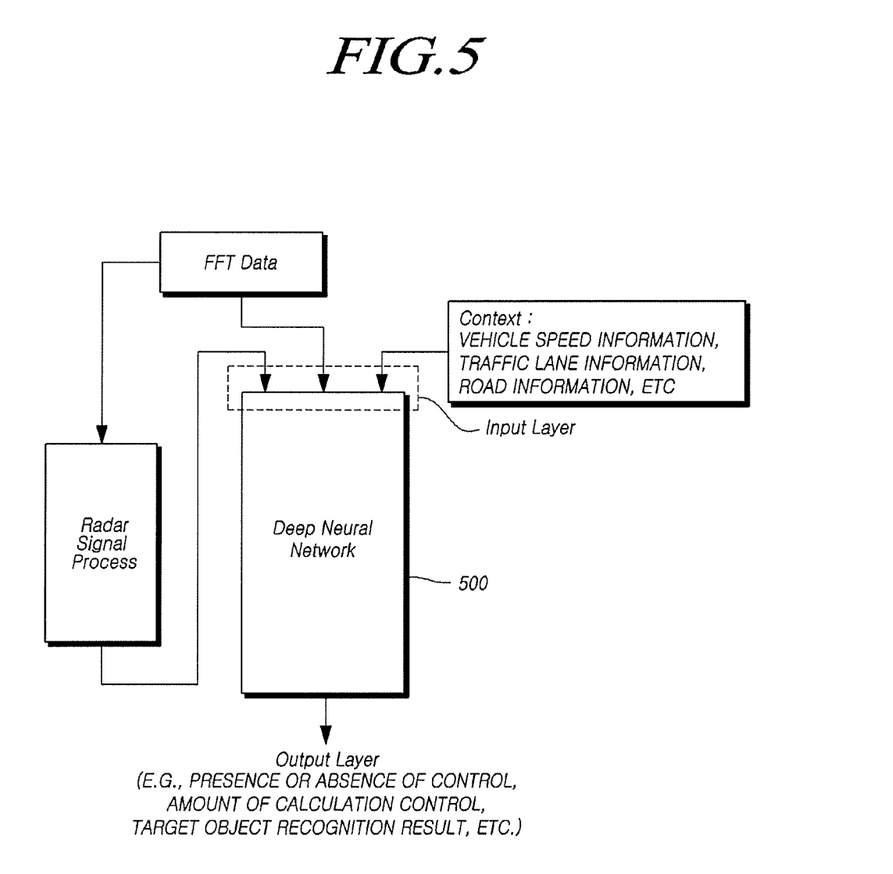
FIG. 5 is a view showing a deep learning algorithm for controlling deep learning-based self-driving according to the present embodiments.
Figure 6:
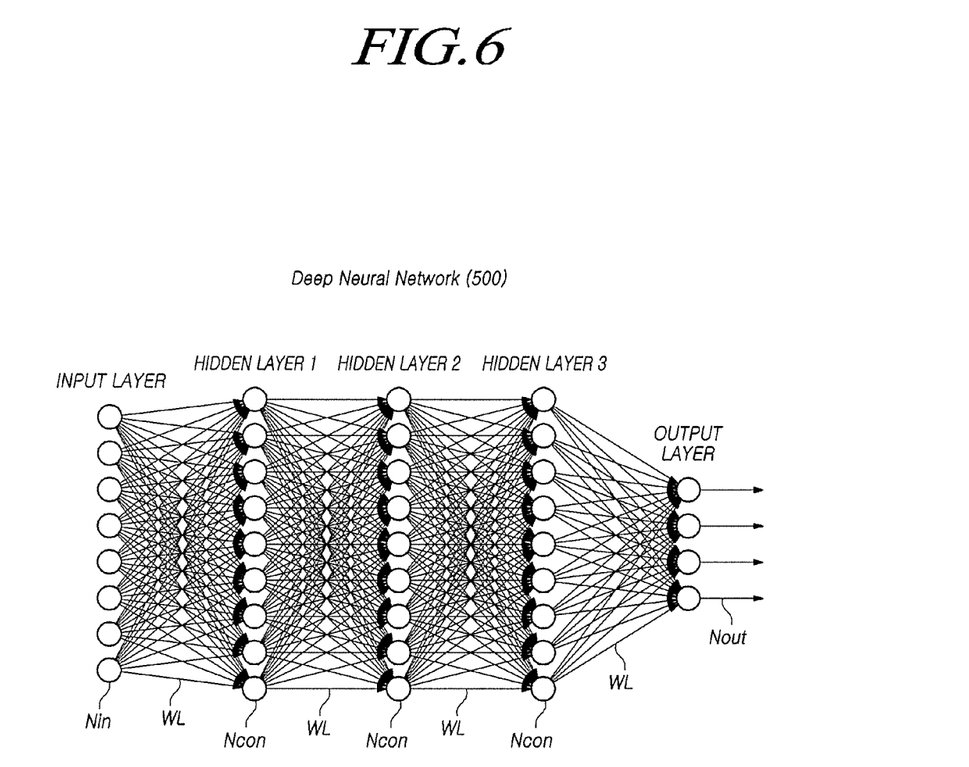
FIG. 6 is an example view of a deep neural network of a deep learning algorithm for controlling deep learning-based self-driving according to the present embodiments.

FIG. 4 is a block diagram of the deep learning-based self-driving control device according to the present embodiments. FIG. 5 is a view showing a deep learning algorithm for controlling deep learning-based self-driving according to the present embodiments. FIG. 6 is an example view of a deep neural network of the deep learning algorithm for controlling deep learning-based self-driving according to the present embodiments.

Referring to FIG. 4, the deep learning-based self-driving control device 300 according to the present embodiments may include a deep learning algorithm execution unit 410 configured to output the result of executing the deep learning algorithm on the monitoring signal obtained by monitoring the peripheral of the vehicle, a self-driving control unit 420 configured to control the self-driving of the vehicle on the basis of the result of executing the deep learning algorithm, a deep learning processing unit 430 configured to change the deep learning algorithm with reference to the driver driving information of the driver 330, and the like.

The deep learning-based self-driving control device 320 may be implemented as a single electronic control unit (ECU).

In some cases, the deep learning algorithm execution unit 410, the self-driving control unit 420, the deep learning processing unit 430, and the like in the deep learning-based self-driving control device 320 may be implemented as two or more electronic control units.

For example, the deep learning algorithm execution unit 410 and the deep learning processing unit 430 may be implemented as one ECU, and the self-driving control unit 420 may be implemented as the other ECU.

When it is determined that the acceleration/deceleration control for the vehicle is necessary, the self-driving control unit 420 may set the amount of acceleration/deceleration control as a target amount of control for the vehicle and then control the acceleration/deceleration of the vehicle. That is, the self-driving control unit 420 performs a behavior control operation including an operation for the driving device of the vehicle on the basis of the amount of calculation control obtained through the execution result of the deep learning algorithm execution unit 410.

The deep learning algorithm execution unit 410 executes the deep learning algorithm on a signal obtained by the sensor 310 monitoring a periphery of the vehicle or a monitoring signal obtained by processing the signal.

The monitoring signal may vary depending on the type of sensor 310.

For example, when the sensor 310 is a radar sensor, the monitoring signal may be a radar signal. As another example, when the sensor 310 is a lidar sensor, the monitoring signal may be a lidar signal. As still another example, when the sensor 310 is a camera sensor, the monitoring signal may be a camera signal. For example, the monitoring signal may include a signal generated by at least two or more of the above-described sensors 310.

Through the execution of the deep learning algorithm on the monitoring signal, the deep learning algorithm execution unit 410 may determine whether an object in front of the vehicle is a control target object for self-driving control on the basis of the monitoring signal and may output a deep learning algorithm execution result including one or more of the presence or absence of control, the amount of calculation control, a control target object recognition result, and the like.

The deep learning algorithm uses a deep neural network 500.

The deep learning algorithm using the deep neural network 500 may be executed (or run) by a processor corresponding to the deep learning algorithm execution unit 410.

Also, data regarding the deep neural network 500, data regarding the deep learning algorithm using the deep neural network 500, and the like may be stored in a memory that is present inside or outside the deep learning algorithm execution unit 410.

For example, it is assumed that the sensor 310 includes a radar sensor. As shown in FIG. 5, the deep learning algorithm may receive radar signal processed through a radar signal process, data processed through Fourier transformation, context information regarding surrounding conditions, and the like through an input layer, may pass the received data, information, and the like through the deep neural network 500, and may output the deep learning algorithm execution result to the output layer.

For example, the deep learning algorithm execution result, that is, a value output at an output node Nout of the output layer may include one or more of the presence or absence of control for self-driving, the amount of calculation control for self-driving, a control target object recognition result, etc.

Data regarding the deep neural network 500 is stored inside or outside the deep learning algorithm execution unit 410.

Referring to FIG. 6, the deep neural network 500 may include an input layer having a plurality of input nodes Nin, an output layer having a plurality of output nodes Nout, one or more hidden layers each having a plurality of connection nodes Ncon for connecting the plurality of input nodes Nin to the plurality of output nodes Nout, and a plurality of weight lines WL for connecting the plurality of input nodes Nin to the plurality of connection nodes Ncon and for connecting the plurality of connection nodes Ncon to the plurality of output nodes Nout.

Each of the weight lines WL may have a weight.

Due to the weights of the weight lines WL, different outputs may be provided for the same input, and the accuracy of the deep learning algorithm execution result may change.

The signal output from the sensor 310 or the monitoring signal obtained by processing the signal may be input to the input layer of the deep neural network 500, and the deep learning algorithm execution result may correspond to values output at a plurality of output nodes Nout of the output layer of the deep neural network 500.

For example, when it is assumed that three output nodes Nout correspond to a vehicle, a pedestrian, and a road structure, values output at the three output nodes Nout may constitute a three-dimensional probability vector. The values output at the three output nodes Nout may include a probability of the detected object being a vehicle, a probability of the detected object being a pedestrian, and a probability of the detected object being a road structure.

When self-driving is not performed, the deep learning processing unit 430 may perform the deep learning training process including comparing the amount of calculation control included in the deep learning algorithm execution result to the amount of driver input control included in the driver driving information, calculating an error value according to a result of the comparison, and adjusting the weights in the deep neural network associated with the execution of the deep learning algorithm on the basis of the error value.

For example, a weight line WL having an adjusted weight may include a weight line connected to any one or two or more layer nodes, for each of which the amount of calculation control is obtained.

Meanwhile, the deep learning processing unit 430 may update the weight of a weight line corresponding to the output layer and update the weight of a weight line corresponding to the hidden layer, in proportion to an error value calculated using a difference between the amount of calculation control corresponding to the deep learning algorithm execution result and the amount of driver input control included in the driver driving information, to adjust the weights in the deep neural network.

A method of finding a weight for minimizing the error value will be briefly described below. A backpropagation algorithm may be used as a training algorithm used in the deep neural network 500 which is multilayered and allows feed-forward.

According to the backpropagation algorithm, by repeating a process of multiplexing and adding an input to the weights of the deep neural network 500 several times, an actual output y (the amount of calculation control) is provided which is a result value for the input.

In this case, the output y (the amount of calculation control) is different from a desired output o (the amount of driver input control) given in the training data.

As a result, an error value e (=y−o) equal to a difference y−o between the actual output and the desired output is generated in the deep neural network 500.

In proportion to the error value e generated in this way, the weight of the weight line corresponding to the output layer and then the weight of the weight line corresponding to the hidden layer are updated.

A weight update direction of the backpropagation algorithm (i.e., output layer □ hidden layer □ input layer) is opposite to a processing direction for the deep neural network 500 (i.e., input layer □ hidden layer □ output layer).

The deep learning-based self-driving control method of the above-described deep learning-based self-driving vehicle 100 according to the present embodiments will be briefly described with reference to FIGS. 7 and 8.

Figure 7:
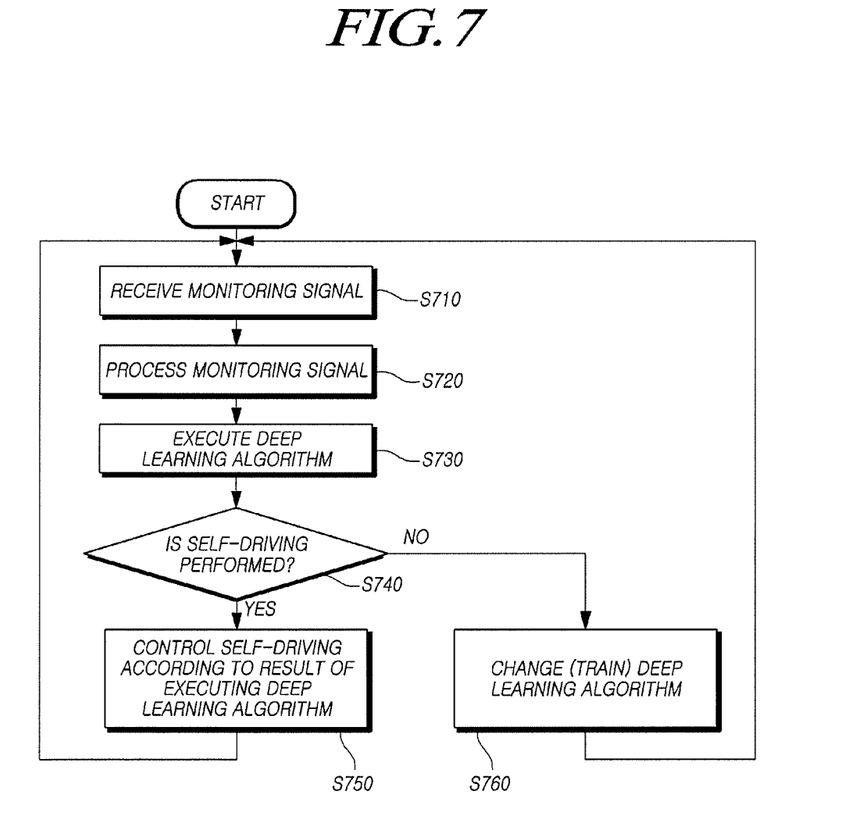
FIG. 7 is a flowchart of a deep learning-based self-driving control method according to the present embodiments.

FIG. 7 is a flowchart of the deep learning-based self-driving control method according to the present embodiments. FIG. 8 is a flowchart of a deep learning algorithm-changing operation (training operation) in the deep learning-based self-driving control method according to the present embodiments.

Referring to FIG. 7, the deep learning-based self-driving control method according to the present embodiments may include receiving a monitoring signal corresponding to a monitoring result of the sensor 310 (S710), processing the monitoring signal in a form suitable for executing a deep learning algorithm (S720), outputting a result of executing the deep learning algorithm on the monitoring signal, which is obtained by monitoring a periphery of the vehicle 100 (S730), determining whether self-driving is performed (S740), controlling the self-driving of the vehicle according to the result of executing the deep learning algorithm when the self-driving is performed (S750), changing the deep learning algorithm with reference to driver driving information when the self-driving is not performed (S760), and the like.

Operation S760, which is a training (machine-training) operation, may be repeatedly performed.

Operation S730 may include determining whether an object in front of the vehicle is a control target object for self-driving control on the basis of the monitoring signal and acquiring and outputting a deep learning algorithm execution result including one or more of the presence or absence of control, the amount of calculation control, a control target object recognition result, and the like, through the execution of the deep learning algorithm on the monitoring signal.

Figure 8:
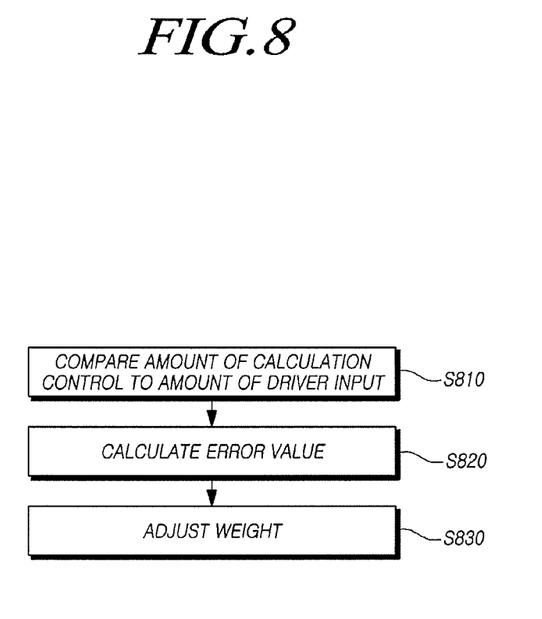
FIG. 8 is a flowchart of a deep learning algorithm-changing operation (training operation) in the deep learning-based self-driving control method according to the present embodiments.

Referring to FIG. 8, operation S760 corresponding to the training (machine training) operation may include comparing the amount of calculation control included in the deep learning algorithm execution result to the amount of driver input control included in the driver driving information when the self-driving is not performed (S820), calculating an error value according to a result of the comparison (S810), adjusting weights in a deep neural network associated with the execution of the deep learning algorithm on the basis of the error value (S830), etc.

According to the above-described embodiments, it is possible to provide a deep learning-based self-driving vehicle 100, a deep learning-based self-driving control device 300, and a deep learning-based self-driving control method which are capable of performing self-driving control to a necessary degree (e.g., presence or absence of control, the amount of control, etc.) in a necessary situation by accurately distinguishing between, and recognizing, a control target object TAR (e.g., a vehicle ahead, a pedestrian, etc.) referenced while the self-driving vehicle 100 is traveling and a structure (e.g., an overpass, a deck plate, etc.) not referenced.

According to the present embodiments, it is also possible to provide a deep learning-based self-driving vehicle 100, a deep learning-based self-driving control device 300, and a deep learning-based self-driving control method which are capable of improving object distinction performance using a sensor signal of a radar sensor or the like and enabling self-driving with high reliability.

According to the present embodiments, it is also possible to provide a deep learning-based self-driving vehicle 100, a deep learning-based self-driving control device 300, and a deep learning-based self-driving control method which are capable of enabling self-driving control that even considers a driver's driving habits.

According to the present embodiments, it is also possible to provide a deep learning-based self-driving vehicle 100, a deep learning-based self-driving control device 300, and a deep learning-based self-driving control method which are capable of enabling recognition and distinction of a control target object with lower processing burden, faster processing speed, and more accurate recognition performance compared to a big data utilizing method used for machine training.

The foregoing description and the accompanying drawings are exemplary only of the teachings of the present disclosure, and it will be apparent to those skilled in the art that various modifications and variations such as combination, separation, replacement, and changes of components can be made without departing from the essential characteristics of the present disclosure. Also, the embodiments disclosed herein are intended not to limit but to describe the technical spirit of the present disclosure, and the scope of the present disclosure is not limited to the embodiments. The scope of the present disclosure should be construed by the appended claims, and all technical sprits within the scope of their equivalents should be construed as being included in the scope of the present disclosure.

What is claimed is:

1. A deep learning-based self-driving control device comprising:
   a deep learning algorithm execution unit configured to output a result of executing a deep learning algorithm on a monitoring signal obtained by monitoring a periphery of a vehicle;
   a self-driving control unit configured to, when the vehicle is self-driving, control the self-driving of the vehicle on the basis of the result of executing the deep learning algorithm; and
   a deep learning processing unit configured to change the deep learning algorithm with reference to driver driving information,
   wherein the monitoring signal is input to an input layer of a deep neural network and the result of executing the deep learning algorithm corresponds to values of a plurality of output nodes of an output layer of the deep neural network,
   wherein the deep neural network includes the input layer having a plurality of input nodes, the output layer, a hidden layer having a plurality of connection nodes for connecting the plurality of input nodes to the plurality of output nodes, and a plurality of weight lines for connecting the plurality of input nodes to the plurality of connection nodes and for connecting the plurality of connection nodes to the plurality of output nodes.

2. The deep learning-based self-driving control device of claim 1, wherein the self-driving control unit determines whether acceleration/deceleration control for the vehicle is necessary by using one or more of an amount of acceleration/deceleration control and presence or absence of acceleration/deceleration control, which correspond to the result of executing the deep learning algorithm.

3. The deep learning-based self-driving control device of claim 2, wherein, when it is determined that the acceleration/deceleration control for the vehicle is necessary, the self-driving control unit sets the amount of acceleration/deceleration control as a target amount of control of the vehicle to control acceleration/deceleration of the vehicle.

4. The deep learning-based self-driving control device of claim 1, wherein the deep learning processing unit calculates an error value using a difference between an amount of calculation control corresponding to the result of executing the deep learning algorithm and an amount of driver input control included in the driver driving information and adjusts weights in the deep learning algorithm in order to reduce the calculated error value.

5. The deep learning-based self-driving control device of claim 4, wherein, when the vehicle is not self-driving, the deep learning processing unit uses an amount of acceleration/deceleration control calculated according to the result of executing the deep learning algorithm as the amount of calculation control and uses an amount of driver manipulation acceleration/deceleration as the amount of driver input control to calculate the error value.

6. The deep learning-based self-driving control device of claim 1, wherein through the execution of the deep learning algorithm on the monitoring signal, the deep learning algorithm execution unit determines whether an object in front of the vehicle is a control target object for self-driving control on the basis of the monitoring signal and outputs the result of executing the deep learning algorithm, which includes one or more of presence or absence of control, an amount of calculation control, and a control target object recognition result.

7. The deep learning-based self-driving control device of claim 1, wherein the deep learning processing unit updates a weight of a weight line corresponding to the output layer and then updates a weight of a weight line corresponding to the hidden layer, in proportion to an error value calculated using a difference between an amount of calculation control corresponding to the result of executing the deep learning algorithm and an amount of driver input control included in the driver driving information, to adjust the weights in the deep neural network.

8. The deep learning-based self-driving control device of claim 1, wherein the monitoring signal includes at least one of a radar signal and a lidar signal.

9. A deep learning-based self-driving vehicle comprising:
   a sensor configured to monitor a periphery of the vehicle and output a monitoring signal;

a deep learning-based self-driving control device configured to perform a deep learning algorithm on the monitoring signal and, when the vehicle is self-driving, output a control signal for controlling the self-driving of the vehicle on the basis of a result of executing the deep learning algorithm and change the deep learning algorithm with reference to driver driving information; and a driving device configured to drive the vehicle according to the control signal, wherein the monitoring signal is input to an input layer of a deep neural network and the result of executing the deep learning algorithm corresponds to values of a plurality of output nodes of an output layer of the deep neural network, wherein the deep neural network includes the input layer having a plurality of input nodes, the output layer, a hidden layer having a plurality of connection nodes for connecting the plurality of input nodes to the plurality of output nodes, and a plurality of weight lines for connecting the plurality of input nodes to the plurality of connection nodes and for connecting the plurality of connection nodes to the plurality of output nodes.

10. The deep learning-based self-driving vehicle of claim 9, wherein through the execution of the deep learning algorithm on the monitoring signal, the deep learning-based self-driving control device determines whether an object in front of the vehicle is a control target object for self-driving control on the basis of the monitoring signal and outputs the result of executing the deep learning algorithm, which includes one or more of presence or absence of control, an amount of calculation control, and a control target object recognition result.

11. The deep learning-based self-driving vehicle of claim 9, wherein, when the vehicle is not self-driving, the deep learning-based self-driving control device performs a deep learning training process including comparing an amount of calculation control included in the result of executing the deep learning algorithm to an amount of driver input control included in the driver driving information, calculating an error value according to a result of the comparison, and adjusting weights in the deep neural network associated with the execution of the deep learning algorithm on the basis of the error value.

12. The deep learning-based self-driving vehicle of claim 11, wherein the deep learning-based self-driving control device stores data regarding the deep neural network, and wherein the deep learning-based self-driving control device updates a weight of a weight line corresponding to the output layer and then updates a weight of a weight line corresponding to the hidden layer in proportion to the error value to adjust the weights in the deep neural network.

13. A deep learning-based self-driving control method comprising:

outputting a result of executing a deep learning algorithm on a monitoring signal obtained by monitoring a periphery of a vehicle;

when the vehicle is self-driving, controlling the self-driving of the vehicle according to the result of executing the deep learning algorithm; and changing the deep learning algorithm with reference to driver driving information, wherein the monitoring signal is input to an input layer of a deep neural network and the result of executing the deep learning algorithm corresponds to values of a plurality of output nodes of an output layer of the deep neural network, wherein the deep neural network includes the input layer having a plurality of input nodes, the output layer, a hidden layer having a plurality of connection nodes for connecting the plurality of input nodes to the plurality of output nodes, and a plurality of weight lines for connecting the plurality of input nodes to the plurality of connection nodes and for connecting the plurality of connection nodes to the plurality of output nodes.

14. The deep learning-based self-driving control method of claim 13, wherein the changing the deep learning algorithm comprises:

calculating an error value using a difference between an amount of acceleration/deceleration control corresponding to the result of executing the deep learning algorithm and an amount of driver manipulation acceleration/deceleration included in the driver driving information; and adjusting weights in the deep learning algorithm in order to reduce the calculated error value.

\* \* \* \* \*